United States Patent
Grover, Jr. et al.

(10) Patent No.: US 9,022,003 B2
(45) Date of Patent: May 5, 2015

(54) PISTON FOR ROBUST AUTO-IGNITION

(75) Inventors: Ronald O. Grover, Jr., Northville, MI (US); Hanho Yun, Oakland Township, MI (US); Tito R. Huffman, Eastpointe, MI (US); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 505 days.

(21) Appl. No.: 13/432,028

(22) Filed: Mar. 28, 2012

(65) Prior Publication Data
US 2012/0255520 A1  Oct. 11, 2012

Related U.S. Application Data (60) Provisional application No. 61/472,582, filed on Apr. 6, 2011.

(51) Int. Cl.
*F02F 3/16* (2006.01)
*F02F 3/28* (2006.01)
*F02B 23/10* (2006.01)

(52) U.S. Cl.
CPC .............. *F02F 3/28* (2013.01); *F02B 23/105* (2013.01); *F02B 2023/106* (2013.01); *Y02T 10/125* (2013.01)

(58) Field of Classification Search
USPC ........... 123/41.35–41.37, 48 A, 48 AA, 48 B, 123/48 R, 192.1, 193.6, 253–255, 279, 294, 123/301, 302, 445
See application file for complete search history.

(56) References Cited

U.S. PATENT DOCUMENTS

| | | | | |
|---|---|---|---|---|
| 6,129,066 | A * | 10/2000 | Umierski | 123/193.6 |
| 6,854,439 | B2 * | 2/2005 | Regueiro | 123/263 |
| 7,954,471 | B2 * | 6/2011 | Nishimoto et al. | 123/261 |
| 2002/0189583 | A1 | 12/2002 | Inoue | |
| 2004/0123833 | A1 * | 7/2004 | Hotta et al. | 123/276 |
| 2005/0178354 | A1 * | 8/2005 | Linderyd et al. | 123/254 |
| 2007/0221165 | A1 * | 9/2007 | Yamaguchi et al. | 123/298 |
| 2010/0059016 | A1 * | 3/2010 | Tachibana et al. | 123/307 |
| 2010/0224143 | A1 * | 9/2010 | Rabhi | 123/41.39 |

FOREIGN PATENT DOCUMENTS

FR    2864152 A1    6/2005

* cited by examiner

*Primary Examiner* — John Kwon
*Assistant Examiner* — Johnny H Hoang (57) ABSTRACT

A piston for an internal combustion engine is located within a cylinder of the engine. The piston includes a dish-shaped depression in a surface of the piston exposed to a combustion chamber of the cylinder providing a recess from a nominal top of the piston. The depression includes a depression boundary located at the nominal top of the piston and proximate to an outer diameter of the piston, an apex, and inclined walls connecting the apex to the depression boundary.

17 Claims, 5 Drawing Sheets

PISTON FOR ROBUST AUTO-IGNITION

CROSS REFERENCE TO RELATED APPLICATIONS

This application claims the benefit of U.S. Provisional Application No. 61/472,582, filed on Apr. 6, 2011, which is incorporated herein by reference.

TECHNICAL FIELD

This disclosure is related to a piston within an internal combustion engine.

BACKGROUND

The statements in this section merely provide background information related to the present disclosure. Accordingly, such statements are not intended to constitute an admission of prior art.

Spark-ignition (SI) engines introduce an air/fuel mixture into each cylinder which is compressed in a compression stroke and ignited by a spark plug. Compression ignition engines inject pressurized fuel into a combustion cylinder near top dead center (TDC) of the compression stroke which ignites upon injection. Combustion for both gasoline engines and diesel engines involves premixed or diffusion flames controlled by fluid mechanics.

SI engines can operate in a variety of different combustion modes, including a homogeneous SI combustion mode and a stratified-charge SI combustion mode. SI engines can be configured to operate in a homogeneous-charge compression-ignition (HCCI) combustion mode, also referred to as controlled auto-ignition combustion, under predetermined speed/load operating conditions. The HCCI combustion mode includes a distributed, flameless, auto-ignition combustion process that is controlled by oxidation chemistry. An engine operating in the HCCI combustion mode has a cylinder charge that is preferably homogeneous in composition, temperature, and residual exhaust gases at intake valve closing time. HCCI combustion is a distributed kinetically-controlled combustion process with the engine operating at a dilute air/fuel mixture, i.e., lean of a stoichiometric air/fuel point, with relatively low peak combustion temperatures, resulting in low NOx emissions. The homogeneous air/fuel mixture minimizes occurrences of rich zones that form smoke and particulate emissions.

Operation in HCCI combustion mode, wherein combustion occurs based upon compression of the charge to a point of substantially uniform combustion throughout the combustion chamber, is highly dependent upon conditions within the combustion chamber. If insufficient heat and/or pressure is present within the combustion chamber, the charge may fail to ignite or may misfire, resulting in unstable combustion and/or a drop in efficiency of combustion. If excessive heat and/or pressure is present within the combustion chamber, the charge may combust before the intended start of combustion, resulting in disorderly combustion and/or ringing in the cylinder.

SUMMARY

A piston for an internal combustion engine is located within a cylinder of the engine. The piston includes a dish-shaped depression in a surface of the piston exposed to a combustion chamber of the cylinder providing a recess from a nominal top of the piston. The depression includes a depression boundary located at the nominal top of the piston and proximate to an outer diameter of the piston, an apex, and inclined walls connecting the apex to the depression boundary.

BRIEF DESCRIPTION OF THE DRAWINGS

One or more embodiments will now be described, by way of example, with reference to the accompanying drawings, in which.

DETAILED DESCRIPTION

Figure 1:
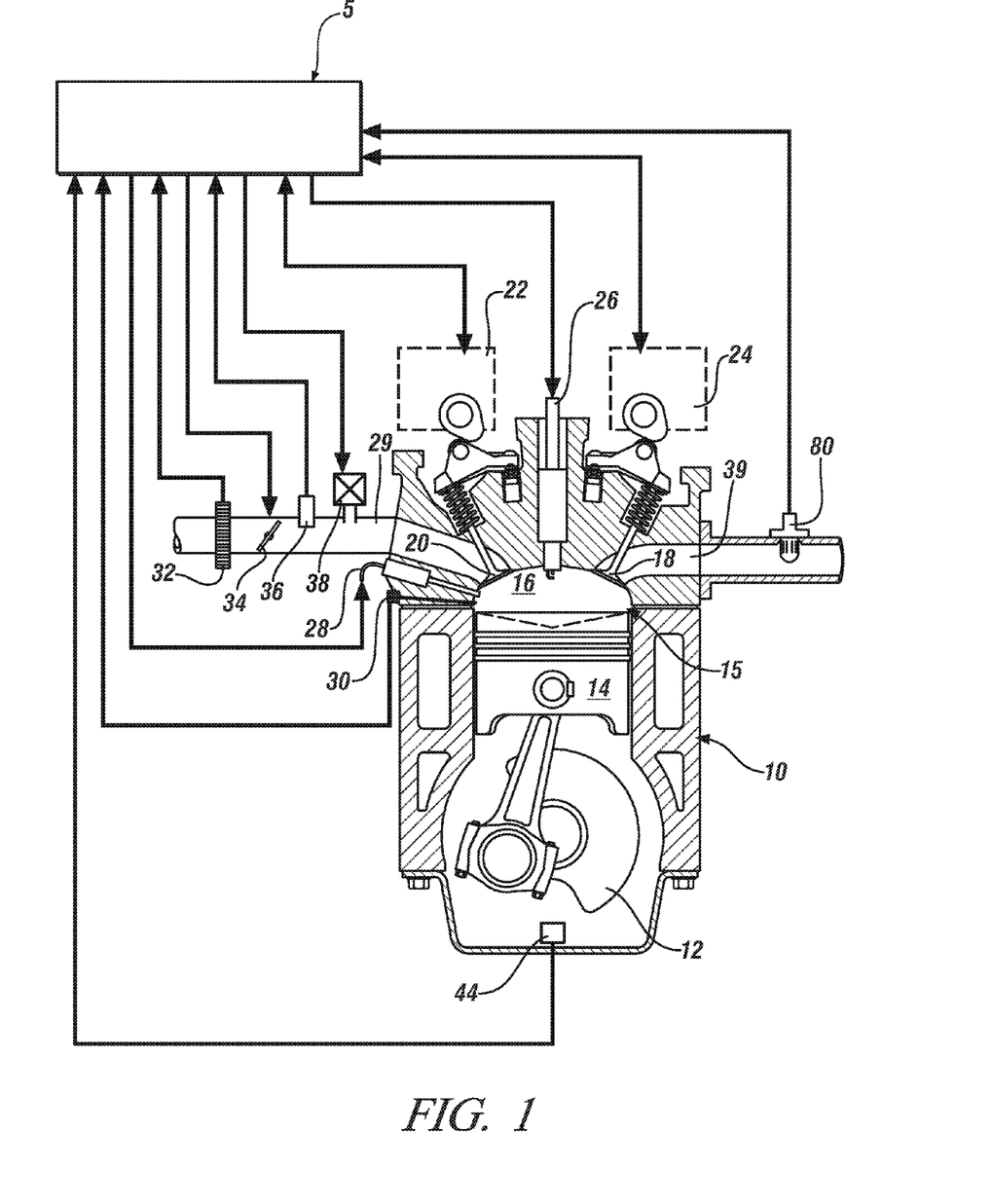
FIG. 1 illustrates an internal combustion engine and accompanying control module, in accordance with the present disclosure.

Referring now to the drawings, wherein the showings are for the purpose of illustrating certain exemplary embodiments only and not for the purpose of limiting the same, FIG. 1 schematically illustrates an internal combustion engine 10 and accompanying control module 5. The engine 10 is selectively operative in a controlled auto-ignition (HCCI) combustion mode, a homogeneous spark-ignition (SI-homogeneous) combustion mode, a stratified-charge spark-ignition combustion mode, or a stratified-charge compression ignition mode.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which their linear reciprocating motion is translated to rotational motion. An air intake system provides intake air to an intake manifold 29 which directs and distributes air into an intake runner to each combustion chamber 16. The air intake system includes airflow ductwork and devices for monitoring and controlling the air flow. The air intake devices preferably include a mass airflow sensor 32 for monitoring mass airflow and intake air temperature. A throttle valve 34 preferably includes an electronically controlled device which controls air flow to the engine 10 in response to a control signal (ETC) from the control module 5. A pressure sensor 36 in the manifold is adapted to monitor manifold absolute pressure and barometric pressure. An external flow passage recirculates exhaust gases from engine exhaust to the intake manifold, having a flow control valve, referred to as an EGR valve 38. The control module 5 is operative to control mass flow of exhaust gas to the intake manifold 29 by controlling opening of the EGR valve 38. Engines may receive naturally aspirated intake air or air drawn in through the intake system through the pumping action of the engine. Engines alternatively can receive charged intake air or intake air pressurized by a turbocharger or supercharger device. The piston configurations and methods disclosed herein can operate with either naturally aspirated or charged intake air, and the disclosure is not intended to be limited to the particular exemplary embodiments disclosed herein.

Air flow from the intake manifold 29 into each of the combustion chambers 16 is controlled by one or more intake valves 20. Flow of combusted gases from each of the combustion chambers 16 to an exhaust manifold 39 is controlled by one or more exhaust valves 18. Openings and closings of the intake and exhaust valves 20 and 18 are preferably controlled with a dual camshaft (as depicted), the rotations of which are linked and indexed with rotation of the crankshaft 12. The engine 10 is equipped with devices for controlling valve lift of the intake valves and the exhaust valves, referred to as variable lift control (VLC) devices. The variable lift control devices in this embodiment are operative to control valve lift, or opening, to one of two distinct steps, e.g., a low-lift valve opening (about 4-6 mm) for low speed, low load engine operation, and a high-lift valve opening (about 8-10 mm) for high speed, high load engine operation. The engine is further equipped with devices for controlling phasing (i.e., relative timing) of opening and closing of the intake and exhaust valves 20 and 18, referred to as variable cam phasing (VCP), to control phasing beyond that which is effected by the two-step VLC lift. There is a VCP/VLC system 22 for the intake valves 20 and a VCP/VLC system 24 for the engine exhaust valves 18. The VCP/VLC systems 22 and 24 are controlled by the control module 5, and provide signal feedback to the control module 5, for example through camshaft rotation position sensors for the intake camshaft and the exhaust camshaft. When the engine 10 is operating in the HCCI combustion mode with an exhaust recompression valve strategy, the VCP/VLC systems 22 and 24 are preferably controlled to the low lift valve openings. When the engine is operating in the homogeneous spark-ignition combustion mode, the VCP/VLC systems 22 and 24 are preferably controlled to the high lift valve openings to minimize pumping losses. When operating in the HCCI combustion mode, low lift valve openings and negative valve overlap may be commanded to generate reformates in the combustion chamber 16. There may be a time lag between a command to change cam phasing and/or valve lift of one of the VCP/VLC systems 22 and 24 and execution of the transition due to physical and mechanical properties of the systems.

The intake and exhaust VCP/VLC systems 22 and 24 have limited ranges of authority over which opening and closing of the intake and exhaust valves 18 and 20 may be controlled. VCP systems may have a range of phasing authority of about 60°-90° of cam shaft rotation, thus permitting the control module 5 to advance or retard valve opening and closing. The range of phasing authority is defined and limited by the hardware of the VCP and the control system which actuates the VCP. The intake and exhaust VCP/VLC systems 22 and 24 may be actuated using one of electro-hydraulic, hydraulic, and electric control force, controlled by the control module 5. Valve overlap of the intake and exhaust valves 20 and 18 refers to a period defining closing of the exhaust valve 18 relative to an opening of the intake valve 20 for a cylinder. The valve overlap may be measured in crank angle degrees, wherein a positive valve overlap (PVO) refers to a period wherein both the exhaust valve 18 and the intake valve 20 are open and a negative valve overlap (NVO) refers to a period between closing of the exhaust valve 18 and subsequent opening of the intake valve 20 wherein both the intake valve 20 and the exhaust valve 18 are closed. When operating in the HCCI combustion mode, the intake and exhaust valves may have a NVO as part of an exhaust recompression strategy. In a SI-homogeneous combustion mode the intake and exhaust valves may have a NVO, but more typically will have a PVO.

The engine 10 includes a fuel injection system, comprising a plurality of high-pressure fuel injectors 28 each adapted to directly inject a mass of fuel into one of the combustion chambers 16, in response to a signal (INJ_PW) from the control module 5. The fuel injectors 28 are supplied pressurized fuel from a fuel distribution system.

The engine 10 includes a spark-ignition system by which spark energy is provided to a spark plug 26 for igniting or assisting in igniting cylinder charges in each of the combustion chambers 16 in response to a signal (IGN) from the control module 5. The spark plug 26 may enhance the ignition process of the engine at certain conditions such as for the HCCI combustion mode (e.g., during cold engine conditions and near a low load operation limit).

The engine 10 is equipped with various sensing devices for monitoring engine operation, including monitoring crankshaft rotational position, i.e., crank angle and speed. Sensing devices include a crankshaft rotational speed sensor (crank sensor) 44, a combustion sensor 30 adapted to monitor combustion and an exhaust gas sensor 80 adapted to monitor exhaust gases, for example using an air/fuel ratio sensor. The combustion sensor 30 includes a sensor device operative to monitor a state of a combustion parameter and is depicted as a cylinder pressure sensor operative to monitor in-cylinder combustion pressure. The outputs of the combustion sensor 30, the exhaust gas sensor 80 and the crank sensor 44 are monitored by the control module 5 which determines combustion phasing, i.e., timing of combustion pressure relative to the crank angle of the crankshaft 12 for each cylinder 15 for each combustion cycle. The combustion sensor 30 may also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems may be used to monitor states of other combustion parameters within the scope of the disclosure, e.g., ion-sense ignition systems, and non-intrusive cylinder pressure sensors.

The engine 10 is designed to operate un-throttled on gasoline or similar fuel blends in the controlled auto-ignition combustion mode over an extended area of engine speeds and loads. However, spark-ignition and throttle-controlled operation may be utilized under conditions not conducive to the controlled auto-ignition combustion mode and to obtain maximum engine power to meet an operator torque request with engine power defined by the engine speed and load. Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used. Methods disclosed herein can be utilized with any of the mentioned fuels. Additionally, methods disclosed herein can be utilized in engines utilizing other fuels, for example, diesel fuel, in configurations wherein a spark plug is utilized. Operation in an HCCI combustion mode is disclosed with relation to methods herein; however, the methods disclosed can be utilized with other combustion modes wherein auto-ignition is utilized.

The control module 5 executes routines stored therein to control the aforementioned actuators to control engine operation, including throttle position, spark timing, fuel injection mass and timing, intake and/or exhaust valve timing and phasing, and EGR valve position to control flow of recirculated exhaust gases. Valve timing and phasing may include predetermined valve overlap, including NVO and low lift of the intake and exhaust valves 20 and 18 in an exhaust re-breathing strategy. The control module 5 is adapted to receive input signals from an operator, e.g., from a throttle pedal position and a brake pedal position, to determine an operator torque request, and from the sensors indicating the engine speed, intake air temperature, coolant temperature, and other ambient conditions.

The control module 5 is an element of an overall vehicle control system, preferably comprising a distributed control module architecture operable to provide coordinated system control. The control module 5 is operable to synthesize pertinent information and inputs from the aforementioned sensing devices, and execute algorithms to control various actuators to achieve control of fuel economy, emissions, performance, drivability, and protection of hardware, as described hereinbelow.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Properties of combustion within the combustion chamber when the engine is operating in an HCCI combustion mode depend upon a number of factors including how the fuel is distributed within the combustion chamber and how much heat is present within the combustion chamber. During operation in HCCI combustion mode, fuel and air are dispersed throughout the combustion chamber in a substantially homogeneous mixture. However, under certain circumstances wherein conditions in the combustion chamber are not conducive to auto-ignition, for example, at low engine speed and low load, methods can be utilized to improve the stability of combustion. For example, a spark assist method can utilize a spark plug to initiate a flame within the combustion chamber, thereby increasing heat within the combustion chamber and causing a flame wave to propagate through the combustion chamber, compressing the remainder of the charge and enhancing the energy available for the homogeneous charge to auto-ignite.

In one embodiment, instead of utilizing a homogenous mixture of fuel and air within the combustion chamber, fuel can be contained in a concentrated area within the combustion chamber and combusted either through auto-ignition, spark, or auto-ignition aided by spark assist. A depression or recessed bowl can be used to contain the fuel within the combustion chamber. An exemplary use of concentrated fuel within the combustion chamber with a recessed bowl-shaped depression in the piston is disclosed in U.S. Pat. No. 6,971,365, which is incorporated herein by reference. By using selected injection geometries, fuel can be sprayed into the recessed bowl and a spark utilized to combust concentrated fuel within the combustion chamber in a concentrated spray combustion mode.

A bowl or similar depression or recess in the piston can be used to contain fuel within a region of the combustion chamber, creating a localized, contained concentration of fuel that can be combusted. This concentrated spray combustion mode utilizing the concentrated fuel can be used interchangeably in the same cylinder with modes of combustion utilizing auto-ignition. A concentration of fuel can be directly sprayed into the recess through direct injection, or a pre-mixed charge, for example, mixed through port injection or other similar means, can be directed into the recess. Depending upon the monitored operating conditions, the engine control module can selectably change modes, for example, based upon engine calibration and methods known in the art for selecting combustion modes for an engine. In a mode wherein auto-ignition or auto-ignition aided by spark assist is utilized to combust the fuel, heat retained within the combustion chamber or the thermal history of the combustion chamber is important to maintaining stable combustion. An increase in heat lost from the combustion chamber to the piston can lower a resulting temperature in the combustion charge, thereby making auto-ignition more difficult to achieve or operable in a smaller range of engine speeds and loads. Testing has shown that heat transfer from the combustion chamber to the ambient environment through the piston increases with increasing surface area of the piston exposed to the combustion chamber. As a result, a recessed bowl design including a depression in an otherwise flat piston surface can include a relatively large surface area, and the corresponding combustion chamber can lose a relatively large amount of heat through the piston making operation of that cylinder in an auto-ignition mode increasingly difficult as compared to a piston with a flat surface. A piston configuration including a dish-shaped depression, with a large, relatively shallow depression taking up a majority or a substantial entirety of the face of the piston can create a recess to contain a concentrated amount of fuel close to a spark plug, facilitating the concentrated spray combustion mode, while reducing complex shapes in the face of the piston, thereby reducing heat transfer from the combustion chamber to the piston and facilitating operation in auto-ignition modes of combustion.

The dish-shaped depression or a depression boundary defining a perimeter of the dish-shaped depression can encompass a substantial entirety of the surface of the piston. A dish-shaped depression in profile includes a sloping wall starting from one side of the piston at or proximate to a nominal top of the piston and receding from the nominal top until a maximum depression is reached, and then includes a sloping up wall approaching the nominal top of the piston at the opposite side of the piston. Because the profile of the dish-shaped depression is gradual and does not include a flat piston interrupted by a relatively deep bowl depression, the dish-shaped depression can include a particular volume within the depression while exposing less surface area to the combustion chamber than would a piston with a bowl-shaped depression with an equivalent volume within the bowl.

The piston, including the dish shaped depression, conforms to other desired characteristics within the combustion chamber. For example, a desired compression ratio related to how much the fuel air charge is compressed must be observed. Holding other geometries within the combustion chamber constant, a larger depression in the piston increases a resulting volume within the combustion chamber when the piston is a top dead center or the point of greatest compression. In a gasoline engine, an exemplary desired compression ratio can be between about 10:1 and 14:1. The geometry of the dish-shaped depression and the depression volume that results can be based upon the desired compression ratio.

The depression contains fuel within a region of the combustion chamber in order to facilitate stable combustion of the fuel by the spark plug while minimizing excessive fuel being trapped within a crevice volume located between an outer periphery of the piston and the cylinder bore wall. Proximity of the spark plug to the apex or point of maximum depression on the piston can be preferred. Further, injection of the fuel into the combustion chamber with a fuel injector accomplishing a desired spray pattern and resulting concentration of fuel within the combustion chamber requires that the combustion chamber include sufficient clearance or open volume around the spray. In one embodiment, such clearance or volume can be described as a desired gap between the spark plug, for example, measured from the tip of a center electrode of the spark plug, and a proximate surface of the depression. According to one embodiment, the gap can be set to a value between 3 and 10 mm. In one embodiment, the gap is a function of the geometry of the dish-shaped depression and the spark plug selected for the combustion chamber. Fuel flow within a combustion chamber and related fluid dynamics are well known in the art and will not be described in detail herein. The geometry of the dish-shaped depression, locating the apex of the depression and determining a depth of the depression, can be based upon the location of the spark plug and the desired fuel spray pattern within the combustion chamber.

Based upon a desired compression ratio and a known geometry of the rest of the combustion chamber, specifically the geometry of the cylinder head, a desired depression volume or a desired total combustion chamber volume can be determined. Based upon the known location of the spark plug and the desired fuel spray pattern within the combustion chamber, a location of the apex of the depression with respect to the center of the circular piston can be determined Apex, as the term is used herein, is understood to mean the lowest point or local surface of the depression as a geometric construct whereat the sloping walls substantially converge. Further, a desired gap or volume around the spark plug can be determined. Based upon minimizing heat transfer from the combustion chamber to the piston, a minimum surface area of the piston exposed to the combustion chamber is desired. Given a depression in the piston reaching a maximum depth at the apex, a minimum surface area includes a surface connecting a perimeter of the surface of the piston to the apex with a straight line profile. Given a depressed apex with respect to the perimeter of the surface of the piston, the ideal shape of the depression to minimize surface area is a cone or a conically-shaped depression. In one embodiment, the cone shape can be rounded either at the apex, the edge of the depression at or near the perimeter of the surface of the piston, or both. The depression, defined by a depression boundary, can start immediately at the perimeter of the surface of the piston, whereat the vertical sides of the piston drop from the surface of the piston. In another embodiment, the piston can include a rim or a beveled shape around the perimeter of the surface of the piston, and the depression boundary can start at the rim. In another embodiment, a ring or flat surface can be included around the perimeter of the surface of the piston, and the depression boundary can start some small radial distance in from the perimeter of the surface of the piston. The depression boundary can be round, oblong, or include some other complex shape. The depression boundary can be as close as possible to the perimeter of the surface of the piston to minimize the surface area of the piston exposed to the combustion chamber.

A piston according to desired characteristics can be configured by setting the apex location with respect to the center of the piston and a desired gap based upon a location of the spark plug and a desired fuel flow, determining a desired combustion chamber volume based upon the compression ratio, and configuring a dish-shaped depression bridging the apex location and a perimeter of the piston, with as small of a total surface area of the piston exposed to the combustion chamber as possible. With a determined location for the apex of the depression, a known desired compression ratio, and a known configuration of the cylinder head, and based upon directly connecting the apex of the depression to a nominal top of the piston with a straight-line wall profile, the location of the nominal top of the piston can be selected to generate the desired resulting volume of the combustion chamber according to methods known in the art.

Figure 2:
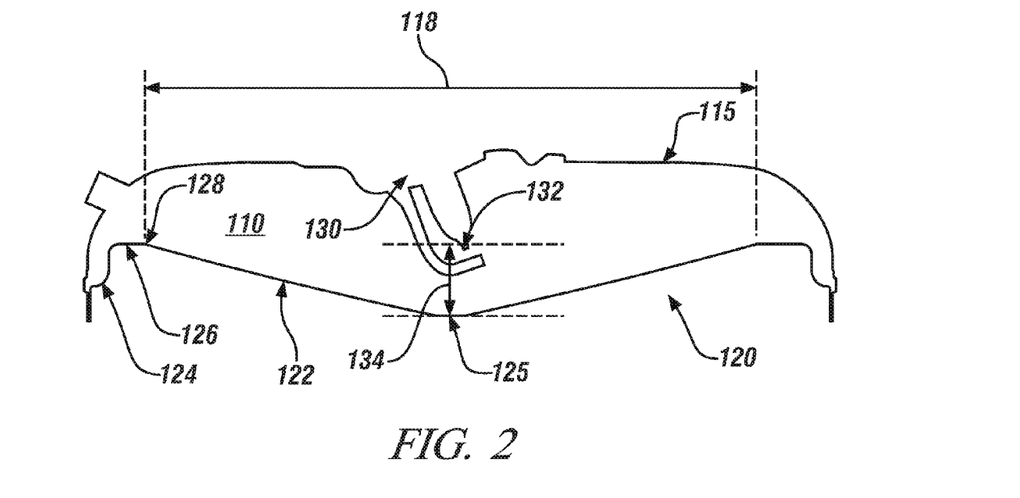
FIG. 2 illustrates an exemplary piston including a dish-shaped depression, in accordance with the present disclosure.

FIG. 2 illustrates an exemplary piston including a dish-shaped depression. Combustion chamber 110 includes cylinder head 115 and piston 120. Spark plug 130 includes a spark plug gap 132. Piston 120 includes a piston rim 124 and a dish-shaped depression 122 located upon a surface of the piston exposed to the combustion chamber 110. Dish-shaped depression 122 provides a recess from a nominal top of piston 120, such that the recess can receive a fuel injection spray and that spray can be localized or contained by the recess within the combustion chamber. Based upon the location of the spark plug 130, a location of an apex 125 of depression 122 on the piston 120 can be determined with respect to the center of the circular piston. A selected gap 134 between apex 125 and spark plug 130 is illustrated. In order to minimize the resulting surface area of the piston 120 and the depression 122, a profile for the depression can be determined by directly connecting the apex 125 to a perimeter or outer diameter of piston 120, for example, with a straight wall with end points at apex 125 and at the perimeter of the piston or a straight-line profile between the apex and the perimeter. Depression 122 can include a generally conically-shaped depression with a narrow end at the apex 125 and a wide end terminating at or proximate to an outer diameter of the piston. A feature can exist between the outer diameter of the piston and a depression boundary defining the start of the dish-shaped depression, for example, including rim 124 of piston 120. In the illustrated embodiment, a feature including a flat surface or flat boundary region 126 on piston 120 is between rim 124 and depression 122, with the transition from the flat boundary region 126 to the depression 122 being defined by depression boundary 128. Depression boundary 128 is illustrated as a circle with diameter 118. Depression boundary 128 can be a circle, an oval, or any other geometric or complex shape. Similarly, apex 125 can be a circle or any other shape, and apex 125 can be flat or can be a small depression or other non-flat shape in accordance with the disclosed piston embodiments herein. In one embodiment, it can be as wide as possible given the features of piston 120. According to another embodiment, it can be selected or adjusted based upon a desired compression ratio and/or a desired volume of the depression. The illustrated depression boundary 128 and the illustrated transition from depression 122 to apex 125 are each illustrated as a sharp corner. Either transition can be rounded in accordance with the present disclosure. The rim 124 and the flat boundary region 126 can in one embodiment be uniform around the surface of the piston exposed to the combustion chamber 110. In another embodiment, the rim 124 and/or the flat boundary region 126 can vary in size or profile around the surface of the piston.

A dish-shaped depression can cover a substantial entirety of the surface of the piston exposed to a combustion chamber. A dish-shaped depression can be defined with a depression boundary at a rim around the perimeter of the piston. In such an embodiment, the dish-shaped depression and the rim together can cover a substantial entirety of the surface of the piston exposed to a combustion chamber. A dish-shaped depression can be defined with a depression boundary at a flat boundary region, with the flat boundary region surrounded by a rim around the perimeter of the piston. In such an embodiment, the dish-shaped depression, the flat boundary region, and the rim together can cover a substantial entirety of the surface of the piston exposed to a combustion chamber. It is preferred that the surface area of the dish-shaped depression includes a majority of the entirety of the surface of the piston exposed to a combustion chamber. Thus, a depression boundary described as proximate to the outer diameter of the piston is understood to correspond to a surface area of the dish-shaped depression that includes a majority of the entirety of the surface of the piston exposed to a combustion chamber.

Figure 3:
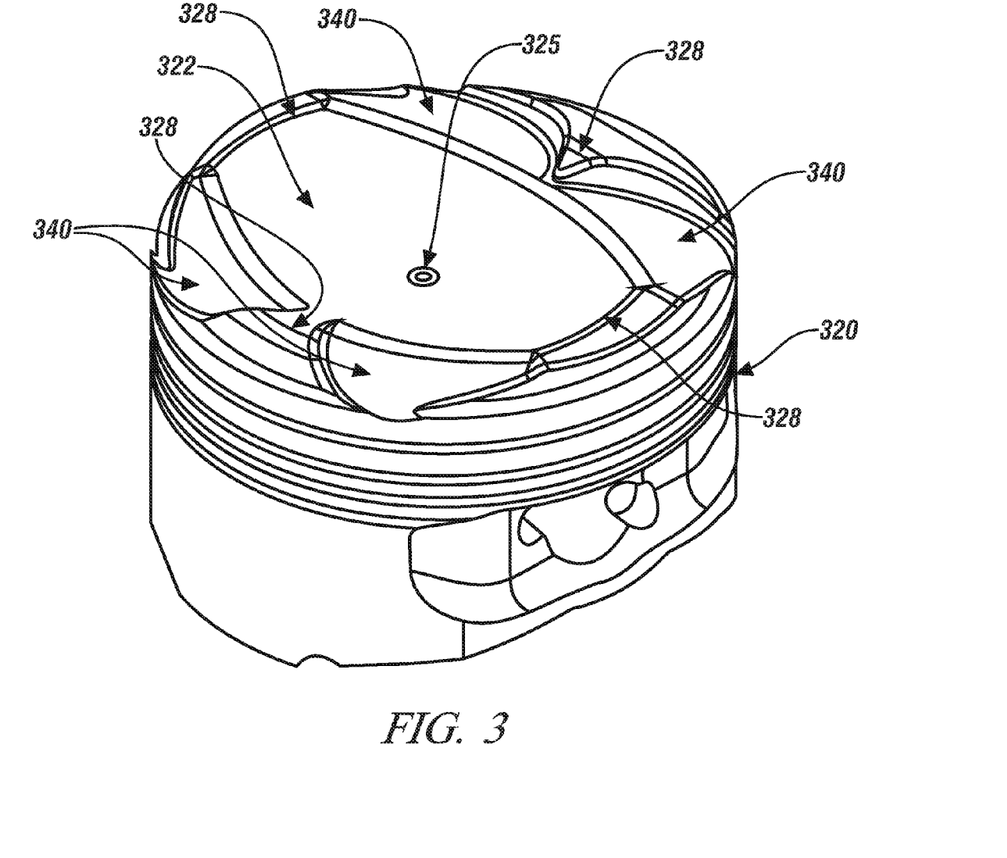
FIG. 3 illustrates an exemplary piston including a dish-shaped depression, in accordance with the present disclosure.

FIG. 3 illustrates an isometric view of an exemplary piston including a dish-shaped depression. Piston 320 includes depression surface 322 and depression boundary 328. Depression surface 322 includes curved surfaces based upon a cone shape with a narrow end at apex 325 and with a wide end corresponding to depression boundary 328. Combustion chambers include at least one intake valve and one exhaust valve. As the valves open, they extend downward into the combustion chamber and can extend into a region that would otherwise be part of the piston. Valve cut-outs 340 are depicted in the top of the piston wherein clearance in the piston is formed such that four valves can open and extend into the combustion chamber without contacting the piston. Depression surface 322 does not form a complete conically-shaped depression, as the valve cut-outs 340 are formed more deeply into the piston surface than would the depression surface 322. Testing has shown that so long as the valve cut-outs 340 do not change the shape of the depression surface 322 near the apex 325, the function of the depression in containing the fuel within a region of the combustion chamber is unaffected. The valve cut-outs 340 do include volume that must be taken into account for the compression ratio, so the shape of the depression surface 322 must be adjusted to maintain the desired compression ratio. It is noted that, in the embodiment of FIG. 3, the depression boundary 328 can be seen around the perimeter wherein it is not interrupted by the valve cut-outs 340, with the boundary defining the geometric shape of the depression surface 322 where it is not interrupted by the valve cut-outs 340. In another embodiment, the thin area between the proximate valve cut-outs and in the small section between the valve shaped cut-outs and the outer diameter of the piston can depart from the shape of the dish-shaped depression without affecting the geometry and function of the dish-shaped depression near the apex.

The depression boundary defining a broad end of the dish-shaped depression can run entirely around the surface of the piston defined as a circle concentric with the piston surface. In some embodiments, the depression boundary can be broken with some feature such as a valve cut-out. In such an embodiment, the depression boundary can include at least one arc spanning a portion of the outer diameter of the piston. Such an arc or arcs can be portions of a circle that would be concentric with and proximate to an outer diameter of the piston if they were uninterrupted by other features of the surface of the piston.

Figure 4:
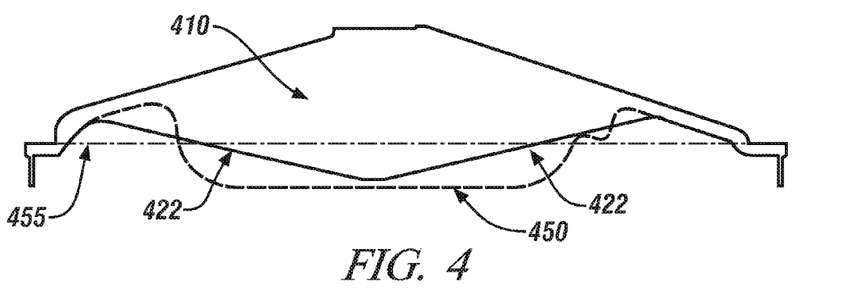
FIG. 4 illustrates a plurality of piston configurations overlaid within a combustion chamber, in accordance with the present disclosure.

FIG. 4 illustrates a plurality of piston configurations overlaid within an exemplary combustion chamber. FIG. 4 illustrates combustion chamber 410 and three alternative piston designs including flat piston surface 455, bowl-shaped depression surface 450, and dish-shaped depression 422. Flat piston surface 455 is a piston without any depression and lacks an ability to contain the fuel injection proximate to the spark plug. Bowl-shaped depression surface 450 includes a depression with steep walls (i.e. substantially vertical) capable of containing the fuel injection in a region of the combustion chamber, but the complex shape of the piston surface includes a large surface area permitting a large heat transfer from the combustion chamber into the piston. Dish-shaped depression surface 422 on the other hand includes a conically-shaped depression, accomplishing fuel containment as disclosed herein while maintaining a minimal surface area. Further, as disclosed in above referenced U.S. Pat. No. 6,971,365, bowl-shaped depression surface 450 can require injection angles to match or correspond to the corners of the bowl to ensure spray containment. Testing has shown that dish-shaped depression surface 422 is not as sensitive to the fuel injection angle and has no bowl corners complicating fuel injection spray pattern control.

Figure 5:
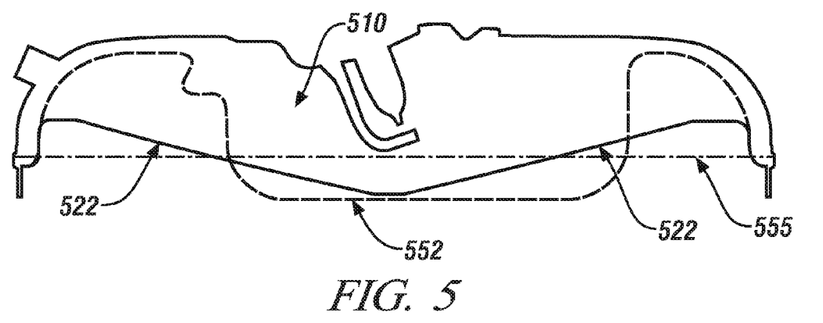
FIG. 5 illustrates a plurality of piston configurations overlaid within a combustion chamber, in accordance with the present disclosure.

FIG. 5 illustrates a plurality of piston configurations overlaid within a second exemplary combustion chamber. FIG. 5 illustrates a second combustion chamber 510 and flat piston surface 555, bowl-shaped depression surface 552, and dish-shaped depression 522, illustrating an alternative cylinder design and how the piston disclosed herein can be incorporated therein.

In both combustion chambers of FIGS. 4 and 5, the peripheral edge of the piston with the dish-shaped depression surface 422,522 where the piston comes close to the top of the respective combustion chamber is higher in the combustion chamber than the flat piston surface 455,555. Regardless of the piston shape, the combustion chamber must correspond to the desired compression ratio so, assuming the remainder of the combustion chamber remains constant, excess volume in the combustion chamber created by forming the depression in or near the center of the piston must be offset by the perimeter of the piston being higher than a corresponding flat piston surface would be.

Figure 6:
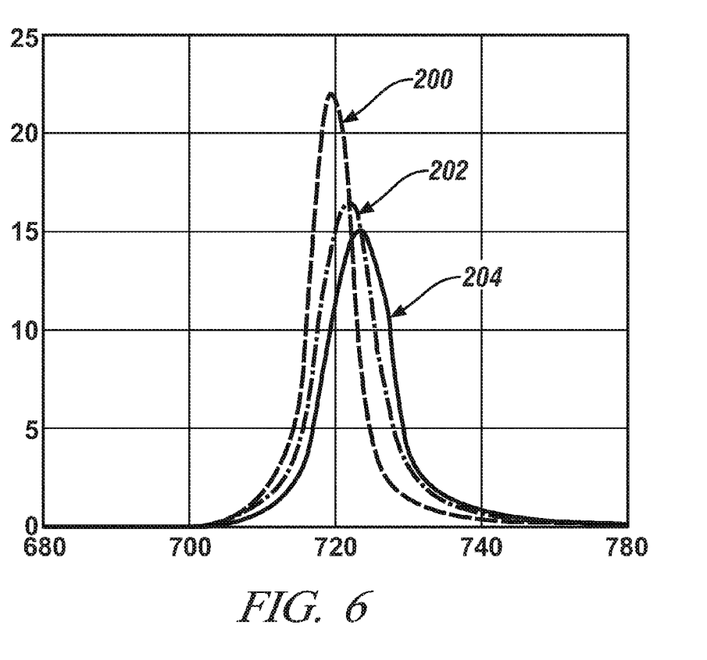
FIG. 6 graphically illustrates computational results of combustion as a heat release rate through a combustion cycle for three different piston designs, in accordance with the present disclosure.

FIG. 6 graphically illustrates computational results of combustion as a heat release rate through a combustion cycle for three different piston designs. The vertical y-axis depicts the heat release rate of the combustion cycle in J/deg, and the horizontal x-axis depicts progression of the combustion cycle as a crank angle of the crankshaft in degrees after top dead center, wherein 720 degrees after top dead center signifies the point at which the piston reaches its highest point of travel within the cylinder. Plot 202 illustrates the resulting combustion with a flat top piston design. Plot 204 illustrates the resulting combustion with a bowl-shaped depression in the piston. Plot 200 illustrates the resulting combustion with a dish-shaped depression in the piston. Plot 200 illustrates a rapid and complete combustion event, wherein the fuel contained close to the spark plug and spark ignition thereof permits rapid and thorough combustion of the fuel with oxygen throughout the combustion chamber. Bowl-shaped depressions with their complex shapes can separate the combustion chamber, isolating some oxygen in the combustion chamber from the fuel and thereby inhibiting rapid combustion. By containing the fuel in the region of the spark plug while maintaining an open combustion chamber with relatively good access to the oxygen within the combustion chamber, the higher heat release rate can be achieved with the dish-shaped depression.

Figure 7:
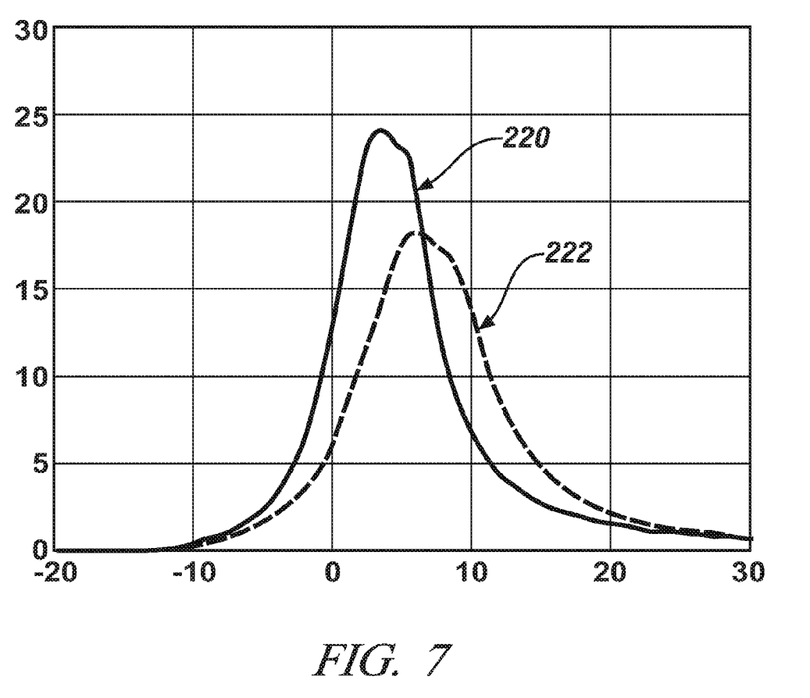
FIG. 7 graphically illustrates experimental results of combustion as a heat release rate through a combustion cycle for two different piston designs, in accordance with the present disclosure.

FIG. 7 graphically illustrates experimental results of combustion as a heat release rate through a combustion cycle for two different piston designs. The vertical y-axis depicts the heat release rate of the combustion cycle in J/deg, and the horizontal x-axis depicts progression of the combustion cycle as a crank angle of the crankshaft in degrees after top dead center, wherein zero degrees after top dead center signifies the point at which the piston reaches its highest point of travel within the cylinder. Plot 222 illustrates the resulting combustion with a bowl-shaped depression in the piston. Plot 220 illustrates the resulting combustion with a dish-shaped depression in the piston. Plot 220 illustrates a more rapid and complete combustion event, wherein the fuel contained close to the spark plug having clear access to the oxygen in the combustion chamber permits rapid and thorough combustion of the fuel with the oxygen throughout the combustion chamber.

Figure 8:
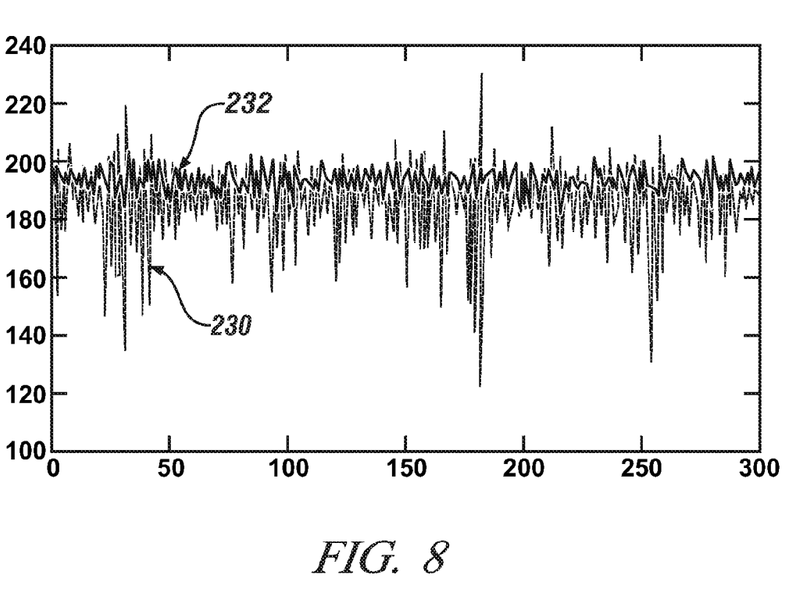
FIG. 8 graphically illustrates experimental results of combustion through a series of combustion cycles with two different piston designs, in accordance with the present disclosure.

FIG. 8 graphically illustrates experimental results of combustion through a series of combustion cycles with two different piston designs. The vertical y-axis depicts IMEP of the combustion cycle in kPa, a measure of how much work is performed by the combustion cycle, and the horizontal x-axis depicts a series of sequential combustion cycles through which the IMEP values are collected. Plot 230 illustrates the resulting combustion of a piston with a bowl-shaped depression and plot 232 illustrates the resulting combustion of a piston with a dish-shaped depression. Plot 230 illustrates substantial variation in the work output of the resulting combustion, whereas plot 232, associated with the dish-shaped depression, illustrates more consistent IMEP values through the combustion cycles due to consistently stable combustion.

A number of characteristics of a dish-shaped depression are envisioned. As described above, a depression with some substantial volume is required in the piston surface in order to contain the fuel injection. Any depression that affects only a minority of an otherwise flat piston surface while fulfilling the required volume is likely to include steeply inclined walls on the sides of the depression, increasing the surface area of the piston exposed to the combustion chamber. A dish-shaped depression is likely to include a majority or a substantial entirety of the surface of the piston. One criteria for a dish-shaped depression quantifies the effectiveness of the depression by comparing the surface area of the region within the depression boundary to the surface area of the piston or a surface area of the piston minus a surface area of a rim around the periphery of the piston. Because the depression minimizes surface area and avoids unnecessarily complex shapes, a dish-shaped depression is likely to include a flat or nearly flat incline connecting the periphery of the piston or depression boundary to the apex of the depression. A maximum inclination of the inclined walls of the depression can be examined. A maximum incline will be affected by how far from the center of the circular piston the apex is located, wherein a higher threshold maximum incline can be acceptable if the apex is closer to the perimeter of the piston. For example, in a piston wherein the apex is in the geometric center of the piston, a dish-shaped depression can be configured with a constraint as follows.

$$\text{Maximum\_Incline\_of\_Depression} \leq 30° \quad [1]$$

In a piston wherein the apex is located midway between the center of the piston and a perimeter of the piston, a dish-shaped depression can be constrained as follows.

$$\text{Maximum\_Incline\_of\_Depression} \leq 60° \quad [2]$$

The inclination angle of the inclined walls of the piston are defined with respect to a horizontal plane normalized to the piston or a surface defined as normal to the cylinder bore walls. According to a similar characteristic of a dish-shaped depression, the height of the depression measured from the bottom of the apex to a highest point in the depression boundary, measured according to a longitudinal direction of the cylinder bore, can be compared to a maximum width of the depression boundary, and the ratio of these terms can be compared to a threshold. An exemplary dish-shaped depression can be constrained as follows.

$$\text{Ratio\_of\_Height\_to\_Width} \leq 1/3.5 \quad [3]$$

A number of similar characteristics are envisioned to identify a dish-shaped depression in a piston, minimizing a surface area of the piston while providing a sufficient depression to accomplish fuel containment, and the disclosure is not intended to be limited to the particular exemplary embodiments provided herein.

Figure 9:
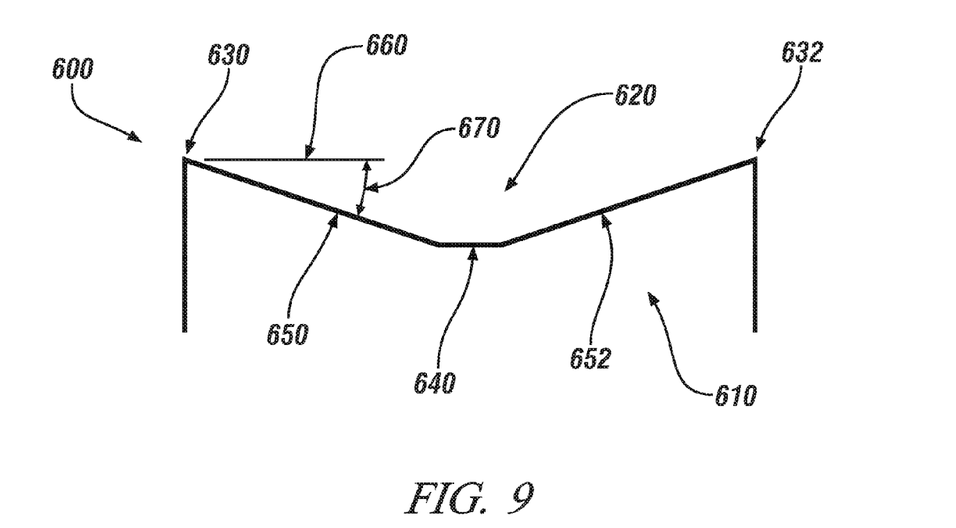
FIG. 9 illustrates a dish-shaped depression with an apex located at a geometrical center of a surface of a piston exposed to a combustion chamber, in accordance with the present disclosure.

FIG. 9 illustrates a dish-shaped depression with an apex at a geometrical center of a surface of a piston exposed to a combustion chamber. Configuration 600 includes piston 610. Piston 610 is illustrated in profile through a center of the piston. Piston 610 includes dish-shaped depression 620 including an apex 640 and a first instance 630 of a depression boundary at an outer diameter of the piston and a second instance 632 of the depression boundary. The depression boundary illustrated extends around the periphery of the outer diameter of piston 610 at a nominal top 660 of the piston. Dish-shaped depression 620 is formed by depression walls 650 and 652 directly connecting apex 640 with first instance 630 and second instance 632, respectively, of the depression boundary. A maximum incline of depression 670 can be defined between a plane defined by nominal top 660 of the piston and a most inclined wall of the dish-shaped depression 620. Because the illustrated apex 640 is in the geometric center of piston 610 and depression walls if piston 610 exemplified by walls 650 and 652 terminate at nominal top 660 of the piston, the walls around the depression have a uniform incline angle. According to one embodiment, in order to constrain a total surface area of the face of piston 610 exposed to the combustion chamber, maximum incline of depression 670 can be constrained to be less than a threshold angle.

Figure 10:
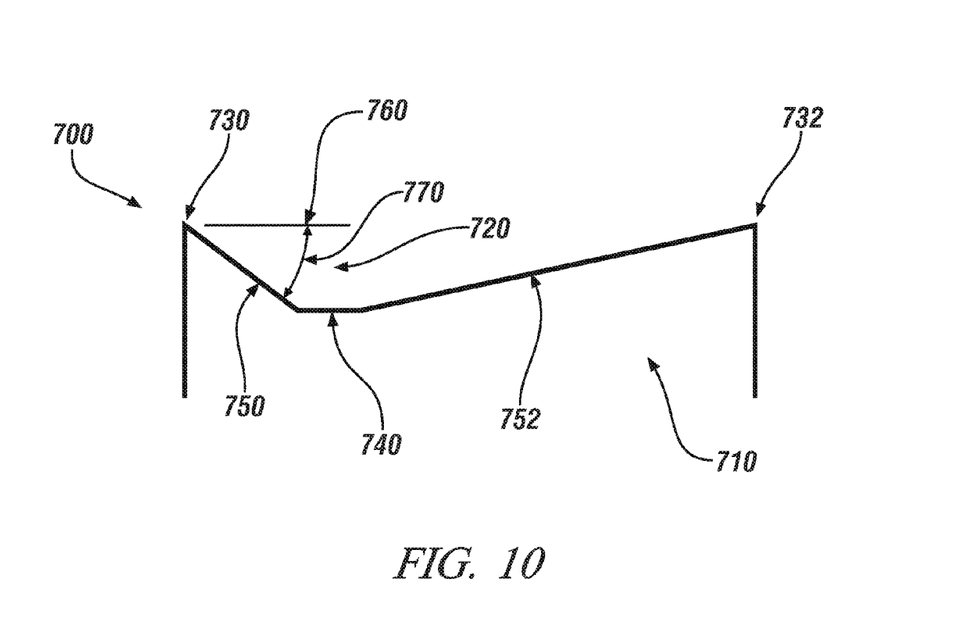
FIG. 10 illustrates a dish-shaped depression with an apex located away from a geometrical center of a surface of a piston exposed to a combustion chamber, in accordance with the present disclosure.

FIG. 10 illustrates a dish-shaped depression with an apex away from a geometrical center of a surface of a piston exposed to a combustion chamber. Configuration 700 includes piston 710. Piston 710 is illustrated in profile through a center of the piston. Piston 710 includes dish-shaped depression 720 including an apex 740 and a first instance 730 of a depression boundary at an outer diameter of the piston and a second instance 732 of the depression boundary. The depression boundary illustrated extends around the periphery of the outer diameter of piston 710 at a nominal top 760 of the piston. Dish-shaped depression 720 is formed by depression walls 750 and 752 directly connecting apex 740 with first instance 730 and second instance 732, respectively, of the depression boundary. A maximum incline of depression 770 can be defined between a plane defined by nominal top 760 of the piston and a most inclined wall of the dish-shaped depression 720. Because illustrated apex 740 is closer to one side of piston 710 than the other and depression walls of piston 710 exemplified by walls 750 and 752 terminate at nominal top 760 of the piston, wall 750 can be selected as the depression wall with the greatest or maximum incline of depression 770. Based upon a need to locate axis 740 at a non-centered location of the piston, a larger maximum incline of depression 770 can be tolerated as compared to maximum incline of depression 670 illustrated corresponding to an apex located at the geometric center of the respective piston 610.

The boundary of the dish-shaped depression can be circular. The boundary of the dish-shaped depression can be oblong or include some other complex shape. The depression can include some small recess or other relief from or conforming to a top surface of the piston. The walls of the depression can, in profile, be lines connecting the apex to the depression boundary, or the walls can be more complex shapes, for example, with parabolic transitions rounding the transition from the depression boundary to the wall or the wall to the apex. The perimeter boundary is disclosed herein as existing at a nominal top of the piston. Frequently, the perimeter boundary can exist within a single plane normal to the bore of the cylinder. However, the perimeter boundary and the resulting dish-shaped depression can be higher at one side of the depression and lower at one side of the depression with an irregular periphery or can alternatively exist in a plane not normal to the bore of the cylinder and still include a dish-shaped depression as disclosed herein. The depression and resulting geometry of the piston can take a number of exemplary embodiments in accordance with the dish-shaped depression disclosed herein, and the disclosure is not intended to be limited to the particular exemplary embodiments provided herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Piston for an internal combustion engine, the piston located within a cylinder of the engine, the piston comprising:
a dish-shaped depression in a surface of the piston exposed to a combustion chamber of the cylinder providing a recess from a nominal top of the piston, the depression comprising:
a depression boundary located at the nominal top of the piston, located proximate to an outer diameter of the piston;
an apex of the depression, the apex comprising a small flat surface located proximately to a spark plug within the cylinder and sized to be not wider than a width of the spark plug; and
inclined linear walls of the depression connecting the apex to the depression boundary;
wherein the dish-shaped depression is configured to keep the surface area of the surface of the piston to a minimum in order to reduce heat transfer from the combustion chamber to the piston.

2. The piston of claim 1, wherein the inclined walls comprise a rounded transition from the inclined walls to the apex.

3. The piston of claim 1, further comprising a plurality of valve cut-outs upon the surface of the piston exposed to the combustion chamber.

4. The piston of claim 1, wherein the dish-shaped depression substantially covers an entirety of the surface of the piston exposed to the combustion chamber.

5. The piston of claim 1, further comprising a rim around the surface of the piston exposed to the combustion chamber; and
wherein the rim and the dish-shaped depression together substantially cover an entirety of the surface of the piston exposed to the combustion chamber.

6. The piston of claim 1, further comprising:
a rim around the surface of the piston; and
a flat boundary region around the surface of the piston; and
wherein the rim, the flat boundary region, and the dish-shaped depression together substantially cover an entirety of the surface of the piston exposed to the combustion chamber.

7. The piston of claim 1, wherein the apex is located at a geometric center of the surface of the piston.

8. The piston of claim 1, wherein the apex is offset from a geometric center of the surface of the piston.

9. The piston of claim 1, wherein the apex is located based upon a desired gap between the apex and a center electrode of the spark plug.

10. The piston of claim 9, wherein the desired gap is between 3 millimeters and 10 millimeters.

11. The piston of claim 9, wherein the nominal top of the piston is located based upon a desired compression ratio of the cylinder, the compression ratio being defined by volumes of the combustion chamber at extreme locations of the piston through a combustion cycle.

12. The piston of claim 1, wherein the inclined walls comprise a maximum inclination angle of 60 degrees.

13. The piston of claim 12, wherein the inclined walls comprise inclination angles between 30 degrees and 60 degrees.

14. The piston of claim 1, wherein the inclined walls comprise inclination angles between 30 degrees and 60 degrees.

15. The piston of claim 1, wherein the inclined walls comprise a rounded transition from the inclined walls to the depression boundary.

16. Piston for an internal combustion engine, the piston located within a cylinder of the engine, the piston comprising:
a dish-shaped depression in a surface of the piston exposed to a combustion chamber of the cylinder providing a recess from a nominal top of the piston, the depression comprising:
a generally conically-shaped depression with a narrow end forming an apex of the depression, the narrow end comprising a small flat surface located proximately to a spark plug within the cylinder and sized to be not wider than a width of the spark plug;
a depression boundary located at the nominal top of the piston, proximate to an outer diameter of the piston, and forming a wide end of the depression; and
inclined linear walls of the depression connecting the narrow end to the depression boundary;
wherein the dish-shaped depression is configured to keep the surface area of the surface of the piston to a minimum in order to reduce heat transfer from the combustion chamber to the piston.

17. Method for combusting fuel in a cylinder of an internal combustion engine, the method comprising:

providing a piston within the cylinder, the piston comprising a dish-shaped depression in a surface of the piston exposed to a combustion chamber of the cylinder providing a recess from a nominal top of the piston, the depression comprising a generally conically-shaped depression with a narrow end forming an apex of the depression, the apex comprising a small flat surface located proximately to a spark plug within the cylinder and sized to be not wider than a width of the spark plug, a depression boundary located at the nominal top of the piston, proximate to an outer diameter of the piston, and forming a wide end of the depression, and inclined linear walls of the depression connecting the apex to the depression boundary, wherein the dish-shaped depression is configured to keep the surface area of the surface of the piston to a minimum in order to reduce heat transfer from the combustion chamber to the piston;

injecting a spray of fuel into the dish-shaped depression; and igniting the fuel with a spark plug while the spray of fuel remains concentrated within the dish-shaped depression.

* * * * *